Figure 1:
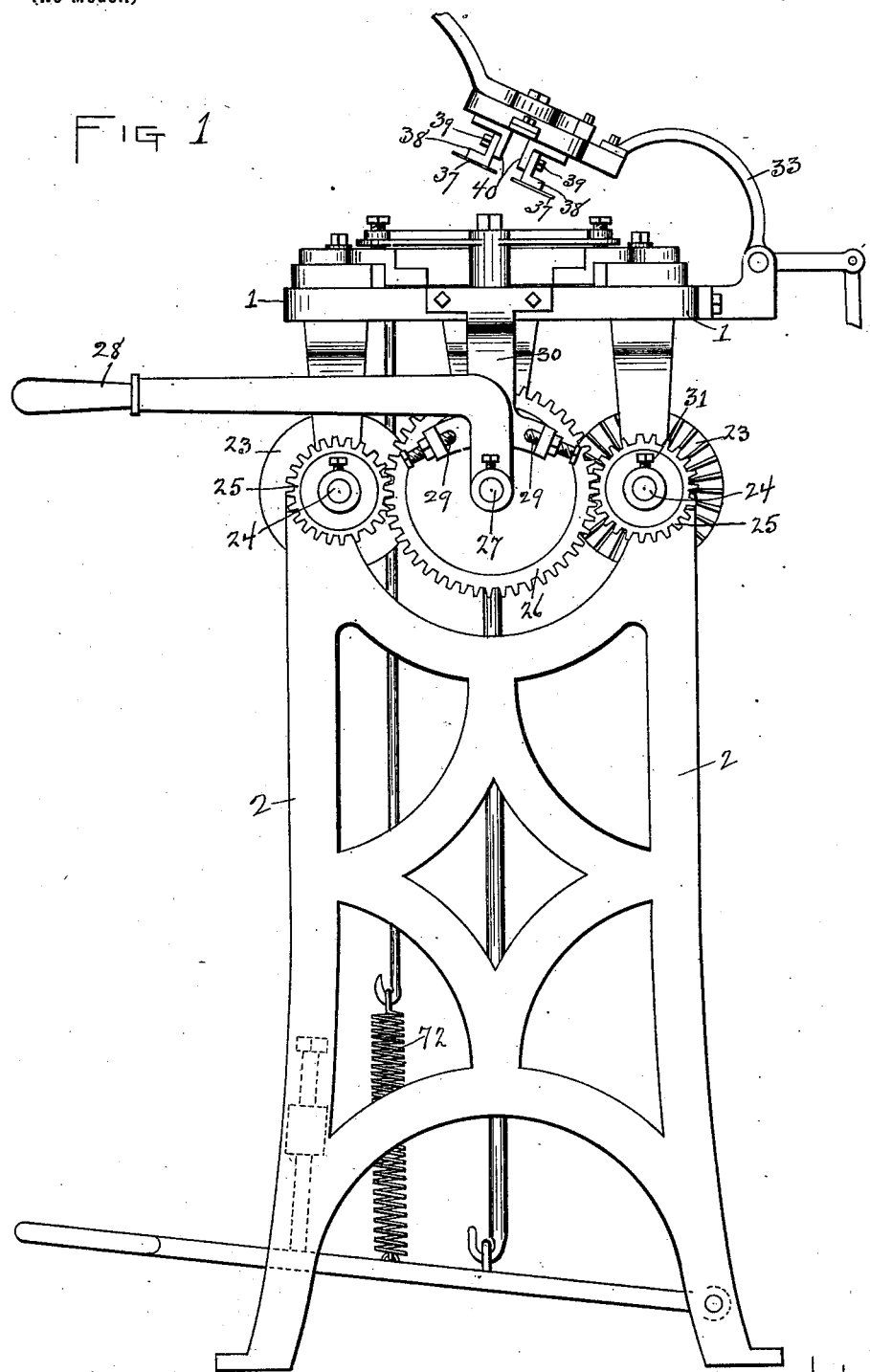

No. 713,230. Patented Nov. 11, 1902.
J. MAITLAND & W. J. BEATTIE.
MACHINE FOR FOLDING COLLAR BLANKS, &c.
(Application filed Apr. 5, 1902.)

(No Model.) 4 Sheets—Sheet 1.

WITNESSES
E. M. O'Reilly
Frank Hagemann

INVENTORS
John Maitland
Walter J. Beattie
By Moshel & Curtis
Attys

No. 713,230. Patented Nov. 11, 1902.
J. MAITLAND & W. J. BEATTIE.
MACHINE FOR FOLDING COLLAR BLANKS, &c.
(Application filed Apr. 5, 1902.)
(No Model.) 4 Sheets—Sheet 2.
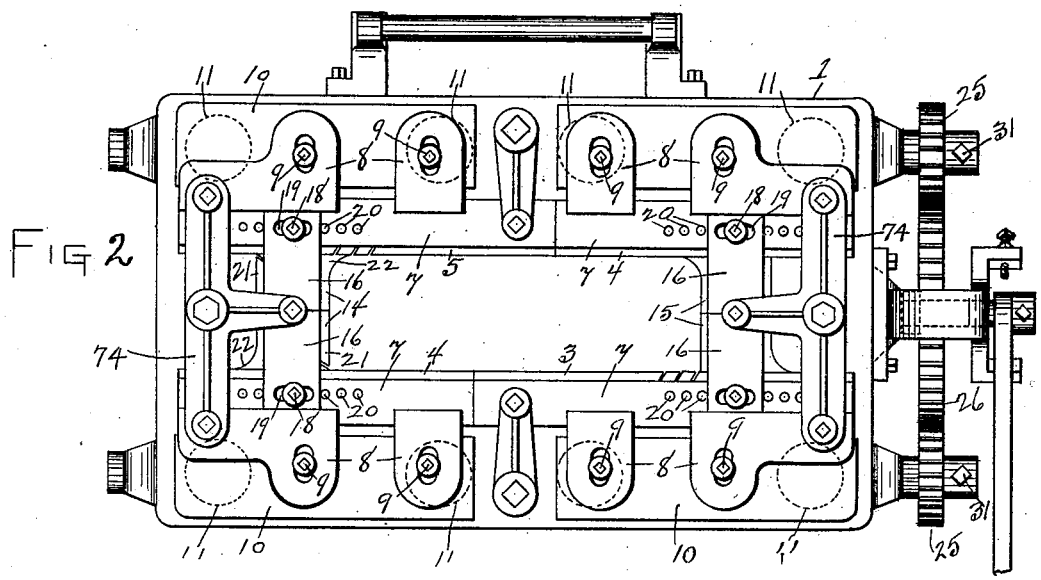
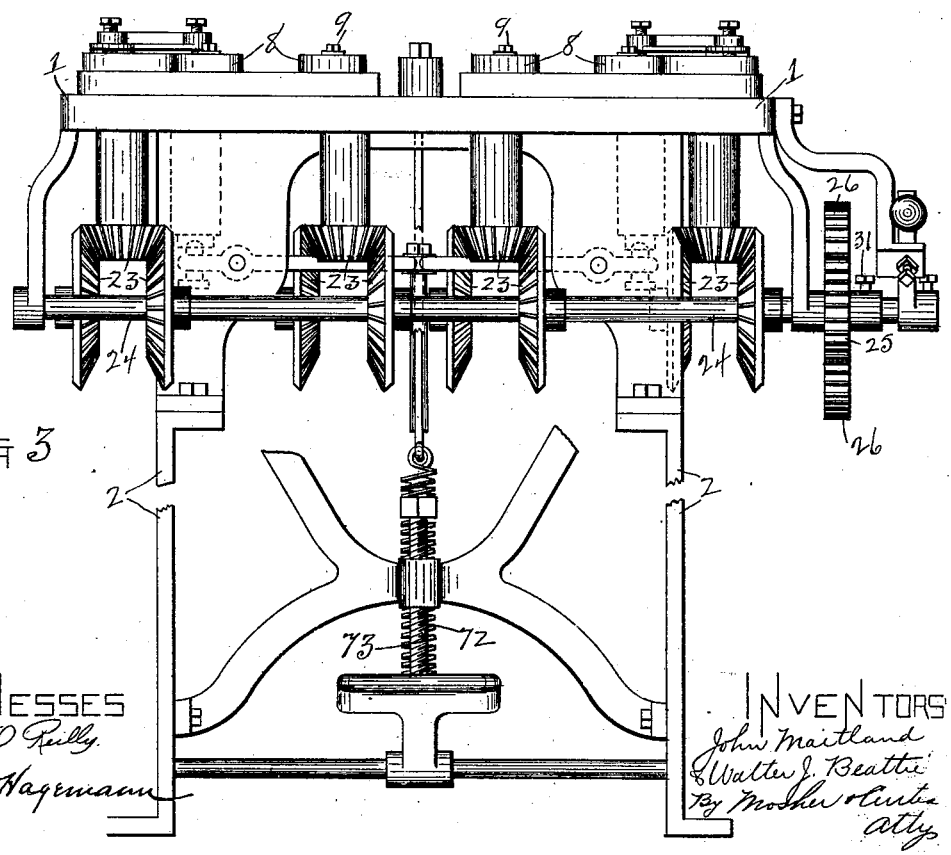

No. 713,230. Patented Nov. 11, 1902.
J. MAITLAND & W. J. BEATTIE.
MACHINE FOR FOLDING COLLAR BLANKS, &c.
(Application filed Apr. 5, 1902.)
(No Model.) 4 Sheets—Sheet 3.
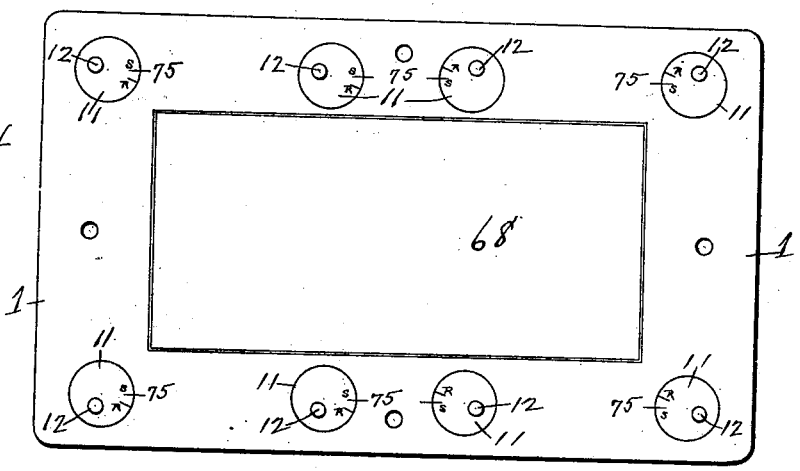
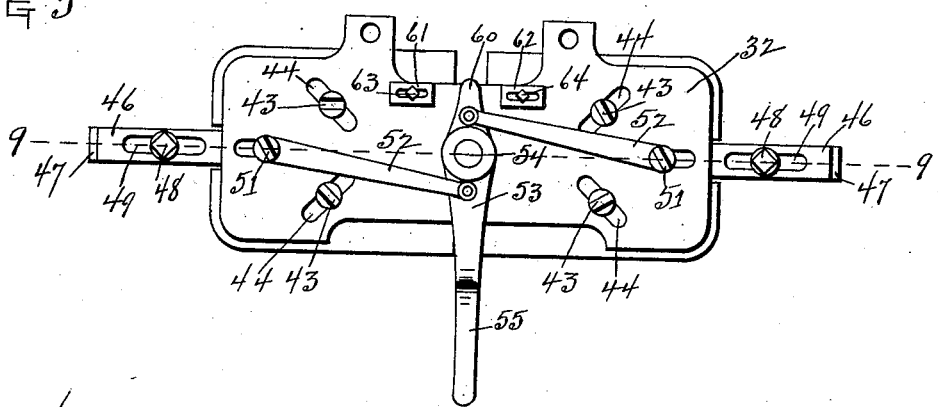
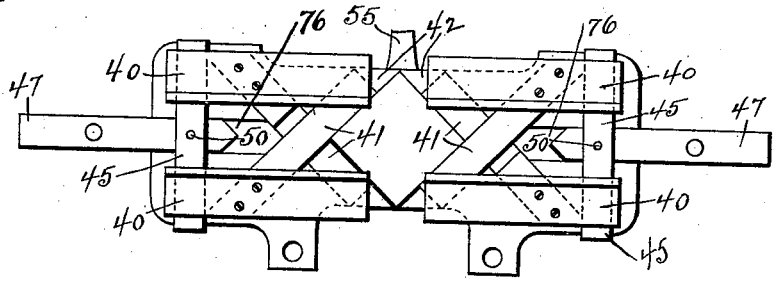
WITNESSES
E. M. O'Reilly.
Frank Hagemann
INVENTORS:
John Maitland,
& Walter J. Beattie,
By Mosher & Curtis
Attys.

No. 713,230. Patented Nov. 11, 1902.
J. MAITLAND & W. J. BEATTIE.
MACHINE FOR FOLDING COLLAR BLANKS, &c.
(Application filed Apr. 5, 1902.)
(No Model.) 4 Sheets—Sheet 4.
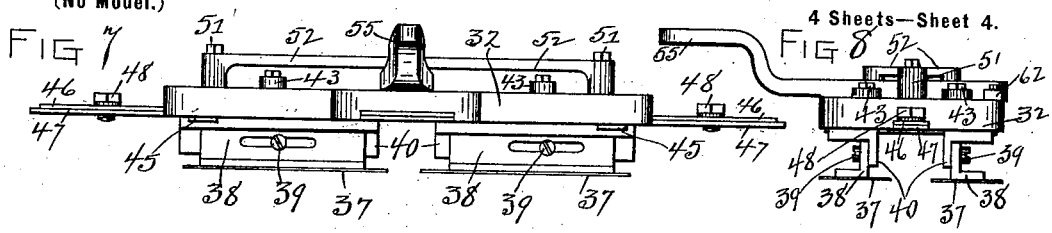
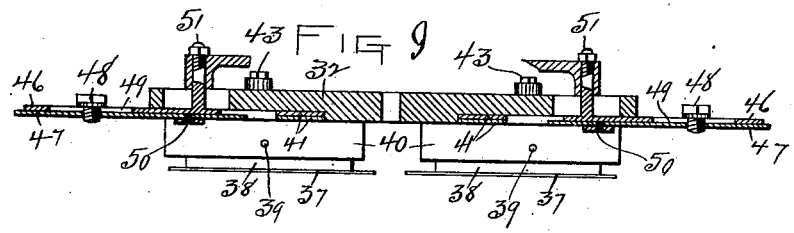
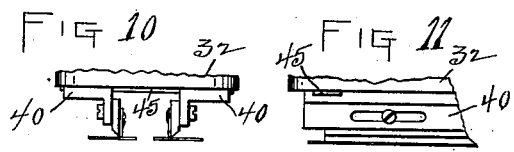
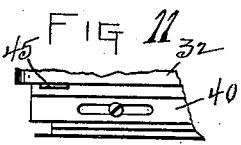
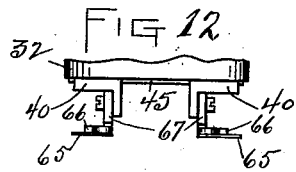
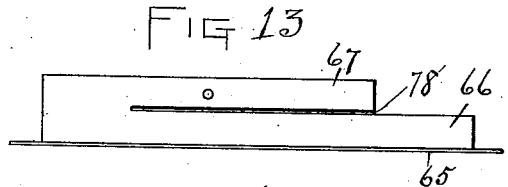
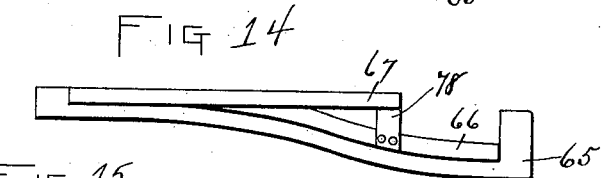
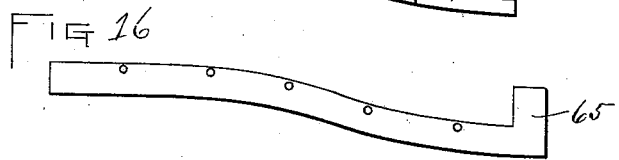
WITNESSES
E. M. O'Reilly.
Frank Hagemann
INVENTORS
John Maitland,
& Walter J. Beattie
By Mosher & Curtis
attys
THE NORRIS PETERS CO., PHOTO-LITHO., WASHINGTON, D. C.

UNITED STATES PATENT OFFICE.

JOHN MAITLAND AND WALTER J. BEATTIE, OF COHOES, NEW YORK.

MACHINE FOR FOLDING COLLAR-BLANKS, &c.

SPECIFICATION forming part of Letters Patent No. 713,230, dated November 11, 1902.

Application filed April 5, 1902. Serial No. 101,493. (No model.)

*To all whom it may concern:*

Be it known that we, JOHN MAITLAND and WALTER JOHN BEATTIE, citizens of the United States, residing at Cohoes, county of Albany, and State of New York, have invented certain new and useful Improvements in Machines for Folding Collars and Cuffs, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in front elevation of our improved folding-machine. Fig. 2 is a top plan view of the same with the former removed. Fig. 3 is a view in front elevation of the same. Fig. 4 is a top plan view of the bed of the machine with the folders removed. Fig. 5 is a top plan view of the former detached and contracted. Fig. 6 is a bottom plan view of the same with the former-plates and former-blocks removed. Fig. 7 is a view in front elevation of the former complete. Fig. 8 is an end view of the same viewed from the right-hand end of Fig. 7. Fig. 9 is a central vertical longitudinal section of the same, taken on the broken line 9 9 in Fig. 5. Fig. 10 is a view similar to Fig. 8 with parts broken away, showing a different style of former-plate and former-block. Fig. 11 is a view in front elevation of the same partly broken away. Fig. 12 is an end view similar to Fig. 10, showing the preferred construction of former-plate and former-block adapted for folding curved-edge work. Fig. 13 is a view in front elevation, on an enlarged scale, of the former plate and block shown in Fig. 12 detached. Fig. 14 is a top plan view of the same. Fig. 15 is a top plan view of the former-block detached. Fig. 16 is a top plan view of the former-plate detached. Fig. 17 is a bottom plan view of one of the crank-operated plates detached.

Our invention relates to improvements in machines for inturning the edges of fabric-blanks in the manufacture of collars and cuffs, and particularly to the style of machine shown and described in United States Letters Patent No. 666,766, dated January 29, 1901, granted to us for machine for folding collars, &c., to which patent reference may be had for a more complete understanding of the present invention.

The object of the present invention is to simplify the construction of such a machine and to facilitate the adaptation of the same to different sizes and styles of blank.

Referring to the drawings, 1 is the bed of the machine, supported by the framework 2. Upon the bed or table are movably supported the folders, comprising thin metal plates suitably mounted upon supporting-blocks, as shown in Fig. 2. Two of said plates 3 and 4, having approximately straight edges, are located just in front of and two similar plates 5 and 6 just in the rear of the space occupied by the former when applied to the bed in the usual manner. Each of these plates is mounted upon a supporting-block 7, having slotted offsetting projections 8, adapted to receive attaching bolts or screws 9, whereby said blocks are adjustably secured to the crank-operated plates 10, respectively, one for each of said folder-plates 3 4 5 6.

The bed of the machine is provided with a plurality of crank-disks 11, two for each crank-operated plate 10, said disks being provided with crank-pins 12, adapted to enter and fit apertures formed to receive them in the respective plates 10. Each plate 10 is an integral structure, thus adapted to engage with and be controlled by a pair of said cranks. The crank-pin recesses 13 are formed in the under side of the plates 10 in such a manner that said plates are operatively connected with the cranks by simply superposing the plates properly disposed upon the crank disks and pins, the superposed plates resting and being adapted to slide upon the upper surface of the bed. Such a construction permits the plates 10, with their connected folder-blocks and folder-plates, to be removed from the machine by simply lifting them from the bed.

The end-folders comprise two folder-plates 14 at one end and two folder-plates 15 at the other end of the space occupied by the former when resting upon the bed. Each of these end-folder plates is mounted upon a folder-block 16, fixed upon one of the side-folder blocks 7 by means of the bolt or screw 18, inserted through the slot 19 in the end-folder block into one of a series of apertures 20 in the side-folder block, whereby adjustment of the end-folder block longitudinally of the side-folder block is permitted.

The end-folder plates are preferably all of the same general form, each having on one side a straight edge 21 and on the opposite side a curved edge 22, whereby it is possible by simple transposition of the end-folders to adapt the machine for folding a blank of general rectangular form having round or square corners or any desired combination of round and square corners.

As shown in Fig. 2, the folders are arranged for a blank having two round corners and two square corners.

By transposing the end-folders connected with the rear side-folder blocks, so that their straight edges will be located on the inside, the machine will be adapted for folding a blank having all square corners, as indicated by dotted lines in said figure, or by transposing the end-folders on the front side-folder blocks the machine will be adapted for blanks having four round corners. In like manner any other desired combination of round and square corners can be secured.

The crank-disks are operated by means of bevel-gear connections 23 with the respective shafts 24 in substantially the manner described in said patent. At one end of the machine the shafts 24 are provided each with a toothed gear 25, said gears being adapted to mesh with a common operating toothed gear 26, fixed upon the shaft 27, upon which shaft is also fixed the operating-handle 28. Adjustable screw-stops 29 are provided on the bracket 30, depending from the bed for the purpose of limiting the reciprocating movements of the handle and the resultant movements imparted to the crank-disks and folders. The means thus provided for operating the shafts 24 afford also a simple means for adjusting the relative positions of the crank-disks of the front and rear folders in changing from round-cornered to square-cornered work. The effect of rotative or angular adjustment of the crank-disks to effect the folding of square corners with a lock fold is fully set forth in said patent. In adjusting the machine to thus produce lock folds at the rectangular corners the end-folders are arranged with their straight edges on the inner side, as above described, and if the crank-disks operating the side-folders, to which these end-folders are attached, are not in the proper position of angular adjustment it is only necessary to loosen the set-screw 31, whereby the gear 25 is fixed to the shaft 24, controlling the movement of such crank-disks, whereupon rotative movement may be imparted to the shaft 24 independently of the gear 25 to rotate the crank-disks to the desired position, after which the set-screw 31 can be tightened to adapt all the cranks to be operated by the handle 28, as before. Any variation in the relative positions of the front and back folder-plates caused by such adjustment of the crank-disks can be corrected by means of the adjustment permitted between the parts secured together by the bolts or screws 9 and 18.

The folders can be adapted for blanks of different widths by a relative adjustment of the parts connected by the bolts or screws 9 and can be adapted for blanks of different lengths by adjustment of the parts connected by the screws 18 in the manner above described.

The former may be of any known form.

The former shown in Figs. 5, 6, 7, 8, and 9 comprises a former-head 32, supported by a frame 33, pivoted to the bed of the machine at 34 and adapted to be moved toward and from the bed in the path of an arc of a circle in any known manner, as by the arm 35 and the link 36, connecting said arm with a treadle (not shown) or other known operating means. Four corner former-plates 37 are employed, each mounted upon a former-block 38, adjustably secured by a screw-and-slot connection 39 to an angle-plate 40, mounted upon a slide-piece 41, capable of reciprocating movements in a slideway 42 on the under side of the former-head, which slideways extend obliquely of the head. The slide-pieces are held in their respective slideways by the screws 43, inserted through slots 44 in the former-head into said slide-pieces, respectively, and adapted to reciprocate in said slots in accordance with the reciprocating movements imparted to said slide-pieces. A cross-bar 45 extends through and fits transverse slideway-slots in the respective angle-plates 40 at each end of the former-head, said cross-bar being secured to a two-part slide-piece the members 46 and 47 of which are adjustably secured together by means of the screw 48 and slot 49. This two-part slide-piece is capable of reciprocating movements in the slideway 76, extending longitudinally of the middle of the former-head on its under side. The under member 46 of this two-part slide-piece is secured to the cross-bar 45, as by screw 50, and the upper member 47 is connected by a screw-post 51 with a link 52, connected with a crank-plate 53, pivoted to the head at 54 and provided with an operating-handle 55, whereby reciprocating movements may be imparted to the two-part slide-piece 46 47 and the cross-bar 45, connected therewith, and through said cross-bar to the angle-plates 40, the movement thus imparted to said angle-plates causing their connected slide-pieces 41 to reciprocate in the diagonal slideways in the head, and thereby imparting to the connecting former plates and blocks reciprocating movements diagonally of the head. The crank-plate is provided with an arm 60, reciprocatory between the slotted stop-plates 61 and 62, adjustably secured to the former-head by bolts 63 and 64, respectively, whereby the movements of expansion and contraction of the former are limited, the stop-plate 62 limiting the movement of expansion and 61 the movement of contraction. These stop-plates afford a convenient means for adapting the former for different sizes of blanks, the size to which the former can be expanded being accurately regulated by adjustment of the stop-plate 62, after which the stop-plate 61 can be adjusted to permit only the movement of contraction required to withdraw the former-plates from the folded edges of the blank in the usual manner. The two-part slide-piece 46 47 affords a further means of adjustment without interfering with the movement of the handle-operated crank-plate 53. By loosening the screw 48 the under member 46, with its connected cross-bar 45, can be caused to slide longitudinally upon the upper member 47, causing any desired movement of expansion or contraction of the former-plates controlled by said cross-bar. The members 46 47 are then again locked together by the screw 48, again subjecting the adjusted former-plates to the action of the handle-operated crank-plate 53 through the connecting mechanism. The adjustment of the former by either of the means above described similarly varies both the length and width of the same. A relative variation in length can be secured by a slide movement of the former-blocks upon the angle-plates 40, accomplished by loosening the screws 39.

Adjustment by means of the stop-plate 62 is desirable only for the purpose of securing great accuracy in the size of the expanded former, which determines the size of the folded blank, while the adjustment permitted by the two-part slide-piece 46 47 is more particularly adapted in adjusting the former for the various sizes of blanks. In adapting the former for folding blanks having curved side edges a former-plate 65 is mounted upon a former-block split part way of its length, one of the members 66 so formed being bent approximately parallel with the edge of the former-plate, while the other member 67 is left straight and serves as a means of attachment of the folder-block to the angle-plate 40 or other support. The members 66 and 67 may be connected together by a brace or strap 78.

As a means for pressing the folded blanks the bed is provided with a central movable section or plate 68, adapted to be forced upwardly toward the folders by means of the levers 69, operated by a rod 70, leading to a treadle 71, in the manner shown and described in said patent. A spring 72 tends to support the treadle in an elevated position against the adjustable stop 73.

Angle-plates 74 are secured to the bed of the machine in position to overhang the folders and resist upward movement thereof, thus causing the blanks to be pressed between the folders and movable section of the bed when the latter is forced upwardly by means of the treadle, substantially in the manner described in said patent.

For convenience in accurately adjusting the crank-disks 11 the bed adjacent to each disk is provided with an indication-mark 75, and each disk is provided with an indication-mark S, adapted to register therewith when the disk is in position adapted for square-end work, and with a similar indication-mark R, adapted to register with the mark 75 when the disk is in position adapted for round-end work.

The use of the angle-plates 40 as supports for the former-blocks permits said blocks to be attached either to the outer side of the depending part of the angle-plate, as shown in Figs. 7 and 8, or to the inner side thereof, as shown in Figs. 10 and 11, in adapting the former for extremely narrow work.

What we claim as new, and desire to secure by Letters Patent, is—

1. In a folding-machine, folding mechanism comprising in part a pair of transposable folders provided on their inner sides with folding edges complementary to each other and on their outer sides with folding edges complementary to each other and differing in configuration from said inner edges; and means for supporting and operating said folders in transposed relation to each other, substantially as described.

2. In a folding-machine, folding mechanism comprising in part a pair of transposable end-folders each provided on its opposite sides with folding edges differing in configuration, each of said edges being adapted to coöperate with a side-folding edge of said mechanism in one of the transposed positions of the end-folder, substantially as described.

3. In a folding-machine, former mechanism comprising in part a former-plate and a former-block split part way of its length, one member thereof being bent to conform to the edge of said former-plate and secured thereto, and the other member being provided with means for securing the same to a supporting member of said former mechanism, substantially as described.

In testimony whereof we have hereunto set our hands this 7th day of December, 1901.

JOHN MAITLAND.
WALTER J. BEATTIE.

Witnesses:
FRANK C. CURTIS,
E. M. O'REILLY.